Feb. 15, 1955 F. W. HOCHMUTH 2,702,235
CHEMICAL ASH DISSOLVING TANK FOR
BLACK LIQUOR RECOVERY UNITS
Filed March 20, 1951 2 Sheets-Sheet 1
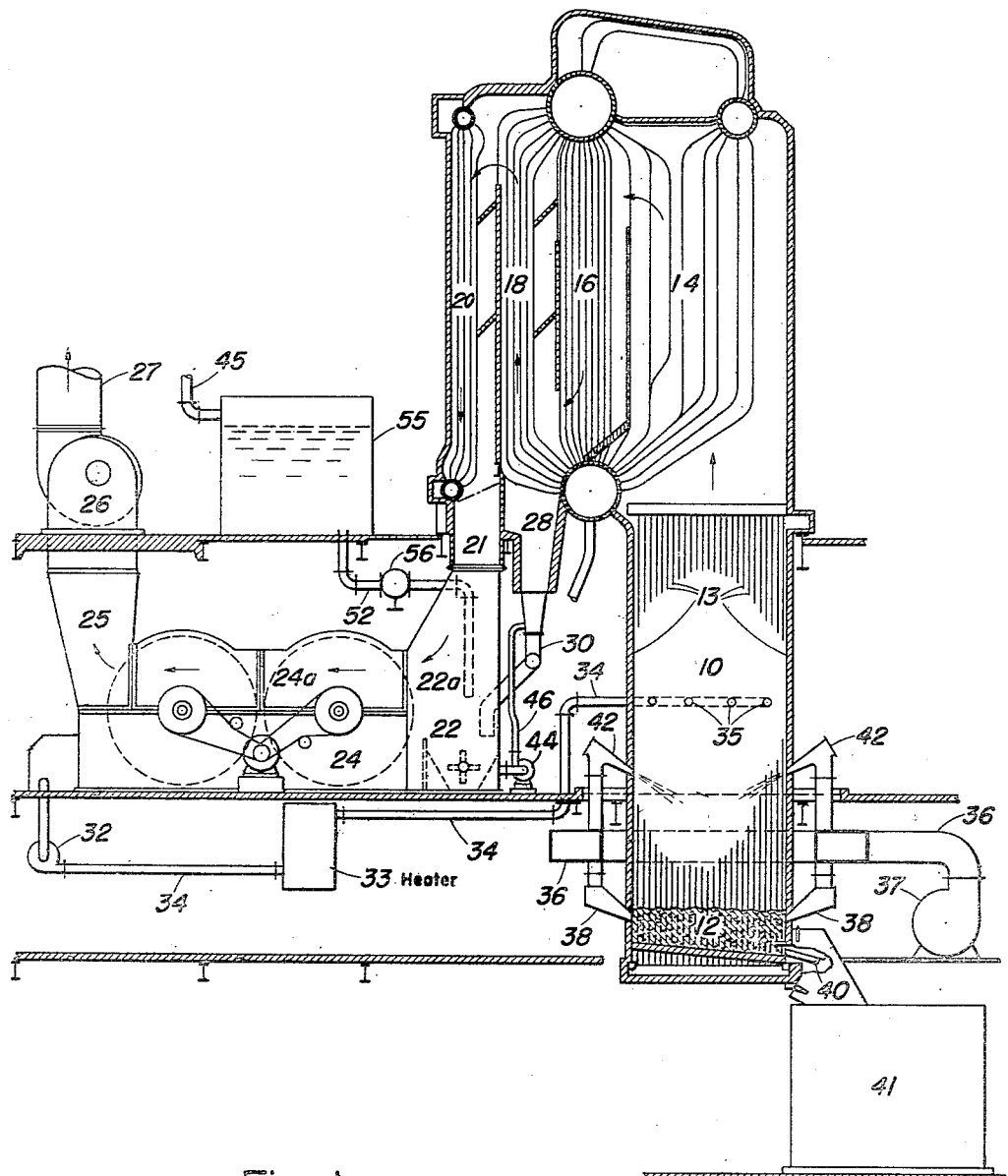
Fig. I.
INVENTOR
Frank W. Hochmuth
BY
ATTORNEY

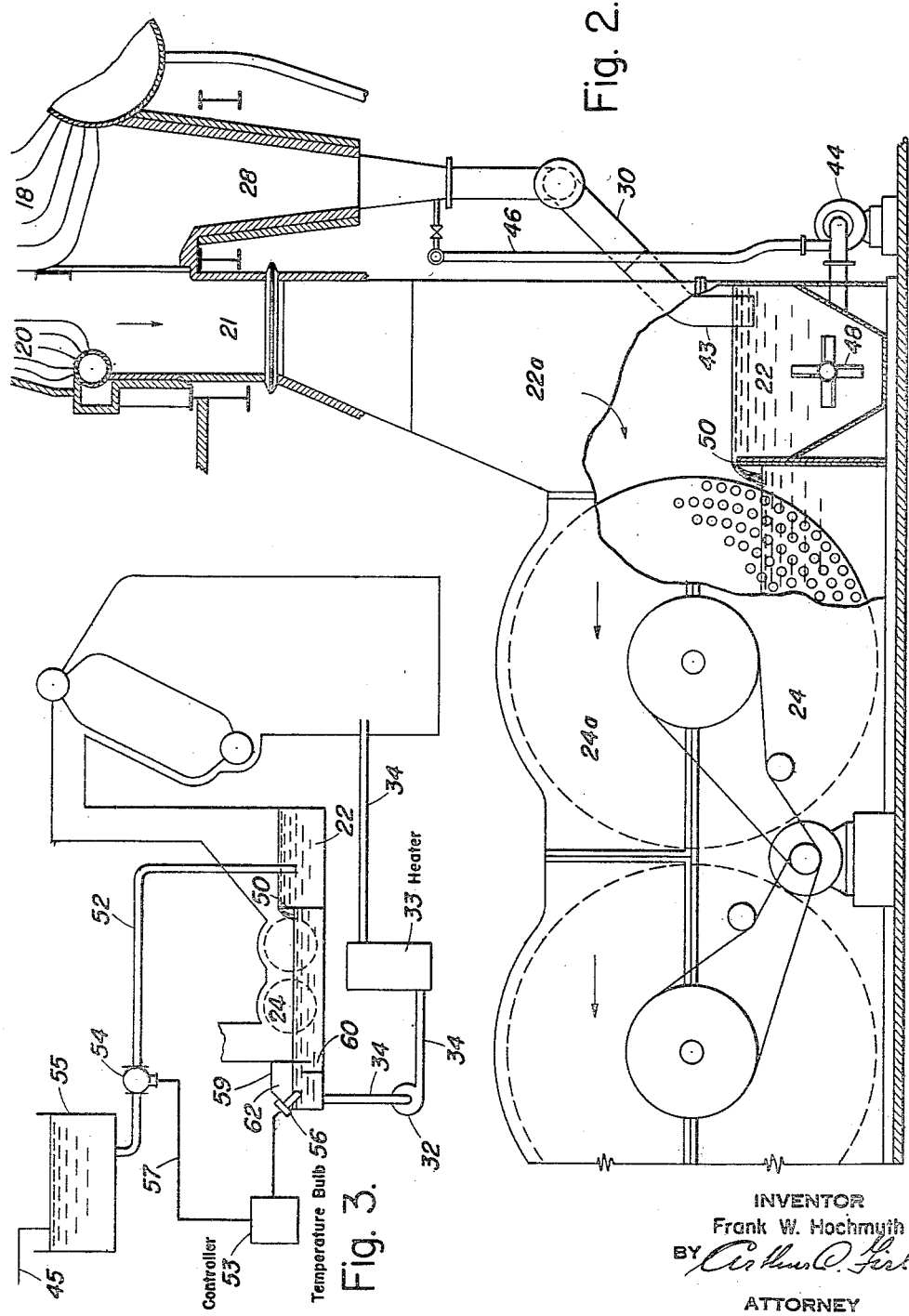

United States Patent Office 2,702,235
Patented Feb. 15, 1955

2,702,235

CHEMICAL ASH DISSOLVING TANK FOR BLACK LIQUOR RECOVERY UNITS

Frank W. Hochmuth, New Providence, N. J., assignor to Combustion Engineering, Inc., New York, N. Y., a corporation of Delaware Application March 20, 1951, Serial No. 216,492

2 Claims. (Cl. 23—262)

This invention relates to the recovery of chemicals from the chemical dust which settles out of the combustion gas stream in the waste heat boiler system of a unit for recovering chemical and deriving heat from the waste liquor of wood pulp mills, and its nature, objects and advantages will appear from the following.

The waste liquor from such mills, also sometimes called black liquor or sulphite liquor, contains carbonaceous material as well as a chemical. To recover this chemical and to derive heat from the carbonaceous material it is customary to provide a recovery unit which consists essentially of a smelter furnace and a waste heat boiler with its appurtenances. The waste liquor concentrated to a desired density is discharged into the furnace and is dried and burned therein, the dried solid matter falling to the bottom of the smelting zone, where a reducing atmosphere is maintained. In that zone reduction takes place and the chemical in the molten state runs out through a smelt spout.

An oxidizing atmosphere is maintained above the smelting zone in consequence of which the unburned combustibles in the gases rising from the smelting zone are burned. The heat derived from the combustion process, which otherwise would be wasted, is absorbed in the heating surfaces of the waste heat boiler over which the combustion gases pass and is used to generate steam. Ordinarily, these chemical recovery systems are self-sustaining, i. e., once started in operation, no supplementary fuel is supplied.

As heat is absorbed by the waste heat boiler unit vaporized chemicals carried in the combustion gases are condensed. Much of this settles out of the gas stream in the form of a powder or dust and collects, for example, at the bottom of the boiler, economizer and air heater passes, precipitators and the like. The remainder in part passes out of the stack with the gases and in part deposits on the surface of the boiler and is removed therefrom by means of soot blowers or hand lances. The deposited particles on removal from the surfaces likewise separate out of the gas stream and settle in such places as those above indicated. The dust consists largely of sodium sulphate and sodium carbonate.

The removal and handling of this chemical dust and the recovery of chemical therefrom present great difficulties in the operation of such systems, the dust being fine and very light per unit of volume.

Heretofore, it had been the practice to drain the accumulated dust into a tank containing a solvent such as water or low density waste liquor for dissolving the chemical ash therein. As the ash is dissolved in the solvent, its density increases reaching a point where the dissolution of chemicals is retarded or practically ceases. After the density of the liquor in the ash dissolving tank had reached this near-saturated condition, the liquor was pumped from the ash dissolving tank into a cascade evaporator for further processing, whereupon the ash dissolving tank was refilled with a fresh batch of solvent to begin a new cycle of dissolving accumulated chemical dust. The above procedure was repeated several times during the day and it had not only become necessary to keep under constant surveillance the liquor level and liquor composition in the ash dissolving tank as well as in the cascade evaporator, but maintenance of these levels had to be coordinated with the varying solid content of the solvent in the ash dissolving tank.

Thus, as soon as it was observed by the operator that the concentration of solids in the ash dissolving tank had reached a point where any further dissolving of chemical ash became too slow, the level of the liquor in the cascade evaporator and the composition of the liquor contained therein had to be in suitable condition to receive the batch of used solvent from the ash dissolving tank or provision had to be made for temporary storage such as in a storage tank.

It can be appreciated from the aforesaid that in order to maintain a close coordination of the operating factors hereinabove described (liquor composition and liquor level), a great number of control appurtenances were required in addition to constant attention by an operator. These appurtenances included a liquor level indicator on the ash dissolving tank and a pump with pipe line to deliver the used solvent from the ash dissolving tank to the cascade evaporator. Furthermore, periodic sampling of the liquor was required by the operator for determination of its composition including the solids content thereof.

The invention herein described endeavors to surmount these difficulties by greatly simplifying the procedure of recovery of chemicals from the fly ash carried in the combustion gases.

It is accordingly the main object of the present invention to eliminate the hereinbefore described batch system and to establish in its place a continuous, self-controlling and semi-automatic method of recovering chemicals from the chemical dust carried in the waste gases of a recovery unit.

An additional object of the invention is to combine the ash dissolving process with the process of evaporating moisture from the liquor in the cascade evaporators, to form a single continuous and coordinating method of treating and recovering chemicals from the ashes carried in the waste gases and return those chemicals to the furnace for further recovery of heat and chemical.

It is a specific object of the invention to simplify the control of the liquor level in the ash dissolving tank.

Another specific object is the elimination of pumping means for transporting the liquor from the ash dissolving tank to the cascade evaporator.

A further object of the herein disclosed inventive improvement is to provide a more compact arrangement of the component parts of a chemical recovery system with consequent saving in space and simplification of piping and control connections.

How the foregoing, together with such other objects and advantages as may hereinafter appear or are incident to my invention, are realized, is illustrated in preferred form in the accompanying drawings, wherein:

Figure 1 illustrates a sectional elevational view of a chemical recovery unit incorporating the herein disclosed inventive improvement and including furnace, waste heat boiler, ash dissolving tank, cascade evaporator and related equipment.

Figure 2 is an enlarged elevational view of the ash dissolving tank and cascade evaporator, portions of which are cut away to show in greater detail the features by which my invention is characterized.

Figure 3 is a control diagram illustrating the simplified semi-automatic control system of the disclosed improved ash dissolving method.

Referring now to Figure 1 the reference numeral 10 denotes a furnace in the bottom of which is a smelting zone 12. This furnace is lined with exposed tubular water walls 13, forming a part of the chemical recovery unit and is of considerable height. Above and to one side of the furnace is located the boiler proper. It has upright banks of tubes 14, 16 and 18 baffled in such a way that the gas stream rising from the furnace chamber 10 passes successively through boiler tube banks 14, 16 and 18. Immediately following boiler bank 18 there is situated an economizer tube bank 20 over which the combustion gases pass downwardly upon leaving the boiler heating surfaces. This down pass connects at its bottom to a duct 21 leading into ash dissolving tank 22 the upper portion 22a of which communicates with a like portion 24a of cascade evaporator 24. The gases accordingly after traversing said upper portion 22a of ash dissolving tank 22 enter a similar upper portion 24a of the cascade evaporator 24 and are eventually discharged through a duct 25 leading from the rear of the cascade evaporator to induced draft fan 26 from which the gases pass to other dust recovery equipment such as an electrostatic precipitator (not shown) or into the atmosphere by way of a stack 27. A hopper 28 is located immediately below boiler bank 18. This hopper communicates by way of a pipe or duct 30 with the ash dissolving tank 22.

The black liquor from the wood pulp mills is in general led successively to multiple evaporators (not shown) and then to cascade evaporator 24 (via feed line 45, storage tank 55 and feed pipe 52, see Fig. 1) where it is finally concentrated to the desired density usually ranging between 65% to 75% solids. The dense liquor is then pumped such as by means of pump 32 through a pipe 34 and heater 33 to liquor nozzles 35 located in the walls of furnace chamber 10 and is sprayed therefrom into the furnace chamber where the spray encounters the ascending flame stream rising from the smelting zone 12. The solids particles in the waste liquor in gravitating to the hearth through the ascending flames and combustion gases are dried therein and collect on the hearth in the form of a bed composed mainly of carbon and chemical. Air forced through duct 36 by forced draft fan 37 is admitted by way of air nozzles 38 through the bed in amounts sufficient to maintain a reducing atmosphere. Reduction of the chemicals takes place and the chemical product runs in molten form from off the hearth by way of smelt spout 40 into a tank 41. The volatile matter in the dried waste liquor particles is burned as the particles descend towards the hearth, by encountering an oxidizing atmosphere above the hearth. Furthermore, combustible gases arising from the bed in passing through this oxidizing atmosphere are also burned. For this purpose additional air is introduced above the smelt bed through nozzles 42.

Some solids are picked up and carried over mechanically by the flame and gas stream ascending in the furnace chamber 10. Chemicals are of course also present in the form of vapor. This vapor is condensed by lowering of the temperature of the gases through the absorption of heat therefrom through tube banks 14, 16, 18 and 20 for the purpose of generating steam in the steam generating unit. The condensed chemical vapor together with the aforementioned mechanical carry-over of solids, assumes largely the form of the dust hereinbefore described. Due to the reversal of direction of the waste gas stream while flowing through the boiler from pass to pass, the dust separates out and settles in hopper 28 and in ash dissolving tank 22. Some particles will adhere to the boiler tube banks 14, 16 and 18 and to economizer tube bank 20 and are from time to time removed therefrom by soot blowers or hand lances whereupon this dust also largely separates out from the gases and settles in the aforementioned hopper 28 and dissolving tank 22.

Referring now to the enlarged illustration shown in Figure 2 it will be noted that the duct 30 leads from hopper 28 to the ash dissolving tank 22 which tank contains black liquor of intermediate concentration obtained from the multiple effect evaporators (not shown) (by way of feed line 45, storage tank 55 and pipe line 52). The spout 43 of duct 30 communicating with the interior of the tank extends well below the normal liquor level therein so that the liquid seals the spout 43 preventing gas from being drawn into the hopper 28 and through pipe 30 by the action of the induced draft fan 26 (Fig. 1), thereby by-passing boiler bank 18 and economizer bank 20. This obviously would interfere with the proper operation of the boiler as intended.

In order to conveniently remove chemical dust and solids carry-over from the hopper 28 as it settles out and collects therein, solvent is pumped from the tank 22 by means of pump 44 through pipe 46 discharging said solvent into the lower end of hopper 28 thereby washing down the collected dust into ash dissolving tank 22.

The dust entrained in the waste gases passing downwardly over economizer 20 is separated out in the space 22a directly above tank 22, due to lower velocity and the sudden change in gas flow direction before the gases enter evaporator 24 on their way to the stack. This dust also collects in tank 22 and is dissolved therein as is the chemical dust entering the ash dissolving tank through pipe 30 and spout 43. The action of agitator 48 located in the bottom of tank 22 accelerates the dissolving process.

Again referring to Figure 2, a common division wall is preferably provided between ash dissolving tank 22 and cascade evaporator 24 including a weir or dam 50 the height of which conveniently controls the liquor level in ash dissolving tank 22. The chemical dust added to the solvent contained in said tank by way of the duct 21 leading from economizer bank 20 and also through duct 30 leading from hopper 28 will contribute to an increase in volume and density of the liquor contained in ash dissolving tank 22 as will the solids carry-over added thereto and carried in suspension therein. This liquor will then automatically flow over weir 50 into cascade evaporator 24, the liquor level of which being maintained at a lower elevation.

In operation, waste liquor having a density of from 40 to 55% solids is discharged into ash dissolving tank 22 to act as a solvent for dissolving chemical dust deposited therein. This liquor will, upon flowing over weir 50 into cascade evaporator 24, have attained a higher concentration of solids due to dissolving of the ash collected from hopper 28 and duct 21 in tank 22. This concentration is further increased in the cascade evaporator to 65% to 70% by the action of the hot gases causing evaporation of the moisture in the liquor when passing through the cascade evaporator 24. A pump 32 (see Fig. 1) thereupon delivers this highly concentrated liquor by way of pipe 34 from the cascade evaporator to the spray nozzles 35 located in the furnace wall. These nozzles discharge the liquor into the furnace chamber 10 for drying and subsequent burning as hereinbefore described.

U. S. Patent 2,340,154 issued to C. A. Stone et al. teaches the method of recovering chemicals from the waste gases of a chemical recovery unit as presently practiced in the prior art. This method provides for handling of the chemical dust and solvent in the manner of a batch system; i. e., tank 22 (see Fig. 1 thereof) is being filled with solvent of low density or water, ash is being collected from the gases, added to said solvent and dissolved therein and upon reaching a predetermined concentration of solids this solvent is being periodically discharged into the cascade evaporator 10 for further processing, whereupon the ash dissolving tank is again refilled with a new batch of low concentration liquor or water. The method as disclosed in Stone et al. 2,340,154 therefore requires constant surveillance of the degree of solids concentration in the ash dissolving tank 22 as well as observance of the liquid level prevailing in said tank. It further requires periodic observation of the liquid level and liquor composition in the cascade evaporator 10 (see Fig. 2 thereof) and the coordination of said level and composition with the solids concentration prevailing in the ash dissolving tank so that when it becomes necessary to renew the solvent in the ash dissolving tank by reason of said liquor having attained an increased volume and solids content, the liquor level and liquor composition in the evaporator must be such that said evaporator tank is able to receive the batch of liquor from the ash dissolving tank. If a low liquid level and desirable liquor composition in the cascade evaporator does not coincide with the evacuation of the liquor in the ash dissolving tank, then it would become necessary to discharge the liquor from the ash dissolving tank into a separate storage tank 31 (see Fig. 2 of U. S. 2,340,154) or to waste.

It can readily be seen from the above description that the recovery of chemical from the waste gases of a chemical recovery unit, if practiced in accordance with the Stone et al. method, will involve the use of various control appurtenances (see Fig. 2 of Stone et al.) such as level gauge 38, piping 24 to deliver the liquor from ash dissolving tank to the cascade evaporator, piping 36, 37 and sampling chamber 35 to take periodic measurements for the determination of the solids concentration of the liquor contained in the ash dissolving tank.

My invention eliminates most of the above appurtenances as heretofore required and as utilized in the apparatus disclosed by Patent 2,340,154 issued to Stone et al. The method of recovering the chemical dust from waste gases as heretofore practiced is greatly simplified by my contribution to the art and operating and maintenance costs are substantially reduced. As herein described the liquor level in the ash dissolving tank 22 (see Figure 2) is automatically controlled by a predetermined height of the weir or dam 50. Increasing the liquor volume in said tank, either by collection of the chemical ash and carried-over solids therein or by adding liquor of intermediate concentration thereto by way of pipe 52 (see Figure 1), will automatically cause liquor to overflow into cascade evaporator 24. It therefore becomes unnecessary for the operator to periodically observe the liquid level in the ash dissolving tank. Determination from time to time of the concentration of solids of the liquor in said dissolving tank is also eliminated. The operator's attention therefore can be solely directed to observing the level and composition of the highly concentrated liquor in the cascade evaporator and the feeding of said liquor to spray nozzles 35 by way of pump 32 and piping 34 as hereinbefore described.

Referring now to the diagrammatic illustration of Figure 3, the preferred embodiment of my invention includes an automatic control for maintaining the liquor level in the cascade evaporator 24. This control organization preferably comprises a pneumatic recorder controller 53 converting the temperature impulse received from a temperature bulb 56 to variation in air pressure in air line 57 whereby feed valve 54 in feed line 52 leading from storage tank 55 to ash dissolving tank 22, is opened or closed. More specifically, it will be noted that the temperature bulb 56 is mounted in the wall of flow box 59 adjacent the cascade evaporator 24 at an elevation corresponding to the desired liquor level. Flow box 59 communicates at its bottom through opening 60 with the liquor body contained in the cascade evaporator 24. The upper portion 62 of flow box 59 is exposed to room air. A substantial temperature difference therefore exists between the upper portion of box 59 (at room temperature of 80 to 100 degrees F.) and the lower portion containing liquor (at a temperature of 180 to 200 degrees F.).

In operation a lowering of the liquid level in evaporator 24 below a predetermined level causes a drop in the temperature of the fluid carried by temperature bulb 56 which in turn, by action of pneumatic recorder controller 53, effects a change in the air pressure prevailing in air line 57 connecting feed valve 54 with said controller 53. This change in air pressure causes said valve to open and to establish a flow of feed liquor from tank 55 through pipe line 52 into ash dissolving tank 22. The addition of liquor to said tank will eventually permit an overflow over weir 50 into cascade evaporator 24 until the liquid in the evaporator tank has reached the aforementioned predetermined level causing, by submergence of temperature bulb 56 an increase of the bulb fluid temperature which subsequently results in the closing of feed valve 54 in the same well known manner above described.

From the foregoing it will be seen that my invention has provided important improvements in the method of recovering chemicals from the waste gases of a chemical recovery unit; that one portion of said invention resides in providing automatic means for controlling the liquor level in the ash dissolving tank; that said facilities will make it unnecessary for the operator to keep said liquor level under surveillance and to determine the amounts of solids in the liquor from time to time; that said facilities will eliminate the piping, valves and pumping means for transporting the used and concentrated liquor from the ash dissolving tank to the cascade evaporator for further concentration therein; that the invention further provides novel and improved means for combining control of the dissolving process in the ash dissolving tank with that of the moisture evaporating process in the cascade evaporator; and that said improved control means make it possible now to conveniently replace the heretofore practiced batch system with a continuous, semi-automatic system of recovering chemicals from the chemical dust which settles out in the waste heat boiler system of a unit for recovering chemical and deriving heat from the wast liquor of wood pulp mills.

Although the herein disclosed preferred embodiment of my invention shows an evaporator of the cascade type, said evaporator and ash dissolving tank being of integral construction, i. e., having a common division wall, my invention can equally well be practiced when employing any other suitable evaporator or in combination with a design in which evaporator tank 24 is separated from tank 22, communicating therewith by any well known means such as a pipe or duct and permitting a flow of liquor by gravity from the ash dissolving tank to the evaporator tank.

Furthermore, although I have shown a temperature actuated pneumatic system of controlling the herein disclosed improved method of dissolving and recovery of entrained chemical dust it will become apparent that equally effective control can be achieved in other ways as through the medium of facilities actuated either electrically, hydraulically or by other known means.

I claim:

1. In a system for recovering chemical and deriving heat from the waste liquor of pulp mills which system has a smelter and a waste heat boiler unit, said boiler unit having one or more regions for the collection of chemical dust formed by the condensation of vaporized chemicals through the absorption of heat; the combination of a first tank adapted to hold a supply of waste liquor to be processed, said first tank having a liquid outflow which fixes a predetermined first liquid level; a second tank adapted to contain a body of liquid and having a liquid overflow which fixes in said second tank a second liquid level at a higher elevation than said first liquid level; a conduit connecting the aforesaid region for dust collection with said second tank for absorbing collected dust in the body of liquid therein thereby tending to increase the volume thereof; communication means between said second tank and said first tank from a point adjacent said second liquid level and permitting a flow of liquid solely by gravity from said second tank into said first tank; and a weir included in said communication means having an overflow edge limiting the level of the liquid in said second tank to a predetermined elevation by permitting the overflow of any excess liquid into said first tank.

2. In a system for recovering chemical and deriving heat from the waste liquor of pulp mills which system has a smelter and a waste heat boiler unit, said boiler unit having one or more regions for the collection of chemical dust formed by the condensation of vaporized chemicals through the absorption of heat; the combination of a tank divided into at least two compartments by a partition wall; the first compartment adapted to hold a supply of waste liquor to be processed and having a liquid outflow which fixes a predetermined first liquid level; the second compartment adapted to contain a body of liquid and having a liquid overflow which fixes in said second compartment a second liquid level at a higher elevation than said first liquid level; a conduit connecting the aforesaid region for dust collection with said second compartment for delivering thereto the collected dust thereby tending to raise the level of said liquid body therein; communication means between said first compartment and a point adjacent said second liquid level in said second compartment permitting a flow of liquid solely by gravity from said second compartment into said first compartment; and a weir included in said communication means having a spillover edge to limit the level of the liquid in said second compartment to a predetermined elevation by permitting the overflow of any excess liquid into said first compartment.

References Cited in the file of this patent

UNITED STATES PATENTS

| Number | Name | Date |
| --- | --- | --- |
| 2,252,307 | Rosencrants | Aug. 12, 1941 |
| 2,258,467 | Owens | Oct. 7, 1941 |
| 2,340,154 | Stone et al. | Jan. 25, 1944 |
| 2,516,992 | Hochmuth | Aug. 1, 1950 |
| 2,524,753 | Betts | Oct. 10, 1950 |